United States Patent [19]
Sable

[11] 3,818,633
[45] June 25, 1974

[54] DEVICE FOR AND A METHOD OF WATERING AND FEEDING PLANTS

[76] Inventor: Donald E. Sable, 4413 Windsor Pky., Dallas, Tex. 75205

[22] Filed: Oct. 18, 1971

[21] Appl. No.: 190,185

[52] U.S. Cl.............................. 47/1.2, 47/58, 47/35, 47/38, 135/15 CF, 150/2.6, 150/48
[51] Int. Cl............................................. A01g 31/00
[58] Field of Search .............. 47/1.2, 34.1, 34, 34.5, 47/35, 37, 38, 38.1, 38.5, 58, 34.11; 52/3; 135/15 CF; 150/2.2, 2.6, 48, 52; 4/172.12

[56] References Cited
UNITED STATES PATENTS

| | | | |
|---|---|---|---|
| 1,249,973 | 12/1917 | Lutey...................................... | 47/35 |
| 1,624,504 | 4/1927 | Pfarr...................................... | 47/35 |
| 1,871,571 | 8/1932 | Weber...................................... | 52/3 |
| 1,964,887 | 7/1934 | Lovett, Jr. ........................... | 47/34.11 |
| 1,994,962 | 3/1935 | Rushfeldt.............................. | 150/1 X |
| 2,152,648 | 4/1939 | Jones..................................... | 47/34.5 |
| 2,189,510 | 2/1940 | Swaney.................................. | 47/1.2 |
| 2,810,235 | 10/1957 | Magid.................................... | 47/38.1 |
| 2,956,370 | 10/1960 | Wieboldt.............................. | 47/35 X |
| 3,053,010 | 9/1962 | DeShazor............................... | 47/34 |
| 3,339,308 | 9/1967 | Clare ..................................... | 47/1.2 |
| 3,355,745 | 12/1967 | Jannuzzi ........................... | 4/172.12 |

FOREIGN PATENTS OR APPLICATIONS

| | | | |
|---|---|---|---|
| 1,393,725 | 2/1965 | France............................... | 47/34.11 |
| 726,497 | 5/1932 | France:................................... | 150/1 |

*Primary Examiner*—J. Reed Fisher
*Assistant Examiner*—Eugene H. Eickholt
*Attorney, Agent, or Firm*—Walter J. Jagmin

[57] ABSTRACT

A device for watering plants rooted in a fibrous substance, such as peat moss and the like, disposed in a wire or perforate basket. A method of watering and feeding plants rooted in a fibrous substance disposed in a wire or perforate basket.

4 Claims, 9 Drawing Figures

PATENTED JUN 25 1974 3,818,633

INVENTOR
Donald E. Sable

BY Walter J. Jagmin
ATTORNEY

PATENTED JUN 25 1974　3,818,633

INVENTOR
Donald E. Sable

BY Walter J. Jagmin
ATTORNEY

DEVICE FOR AND A METHOD OF WATERING AND FEEDING PLANTS

This invention relates to devices for and methods of watering and feeding plants rooted in a fibrous substance disposed in a perforate container.

An object of this invention is to provide a new and improved device for and method of watering and feeding plants rooted in a fibrous substance held in a perforated container which is suspended by flexible members such as chains, from an overhead structure.

Another object is to provide a device for watering or feeding plants, of the type described, having a flexible imperforate circular sheet which is securable to the means by which the basket is suspended to form a cup-shaped container or pouch about the basket in which water or a solution of water and plant food may be held to permeate the fibrous substance in which the plants are rooted held by the basket.

Another object is to provide a device of the type described, wherein the imperforate sheet is circular in form and has a plurality of eyelets spaced about its periphery, hanging hooks secured to three of the eyelets for detachably securing the sheet at three spaced locations to the suspension means of the basket and gathering hooks engageable with the suspension hooks and with any one of the eyelets for gathering the outer peripheral portions of the sheet to form an upwardly opening pouch or container in which a liquid such as water or a solution of water and plant food may be held.

An important object of the invention is to provide a new and improved method for watering and feeding plants rooted in a fibrous substance held in a hanging perforate basket or container which includes placing an open mouth container about the basket, introducing a liquid into the container to a level to cause at least the lower portion of the fibrous substance to be immersed in the liquid and maintaining the liquid in the container for a given period of time to permit absorption of the liquid by the fibrous substance as well as the plant roots, draining the liquid from the container fibrous substance, maintaining the container in place until the dripping of liquid from the fibrous substances ceases, and then removing the container from about the basket.

Still another object is to provide a method for watering and feeding plants wherein the container is formed of an inperforate flexible sheet and the water is drained from the container by forming a portion of the sheet into a drain spout.

Additional objects and advantages of the invention will be readily apparent from the reading of the following description of a device constructed in accordance with the invention, and reference to the accompanying drawings thereof, wherein.

Figure 1:
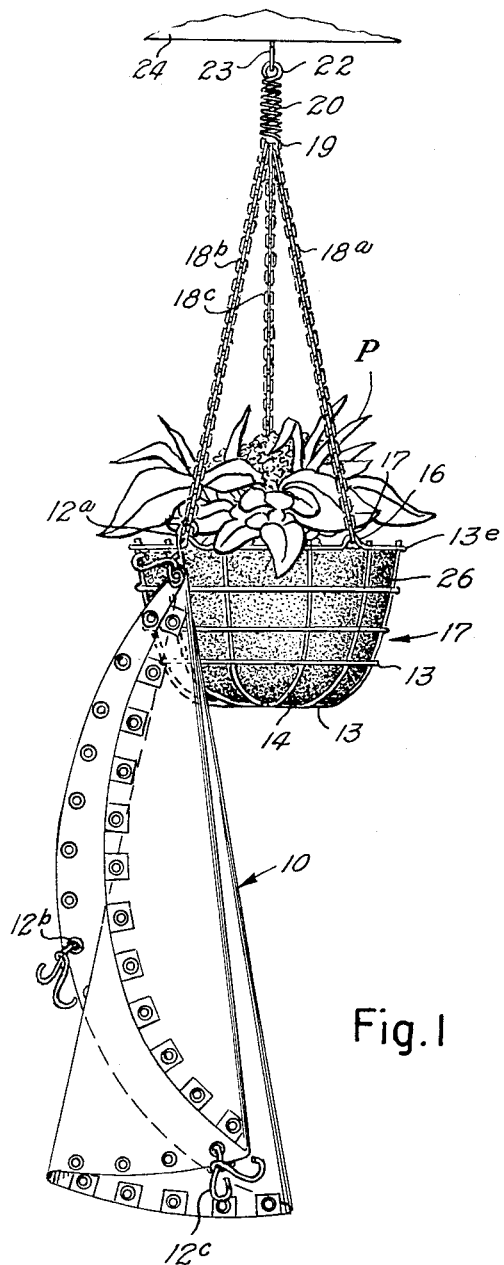
FIG. 1 is a side view of a hanging basket supporting a fibrous substance, such as peat moss, in which plants are rooted, and a watering and feeding device embodying the invention secured by a single suspension hook therefrom.

Referring now particularly to FIGS. 1 through 8 of the drawings, the watering device 10 is securable to a wire basket 11 by means of hanger hooks 12a, 12b and 12c.

The illustrated basket 11 is formed of a plurality of circular wires 13a–e which extend about and are secured as by welding to a plurality of outwardly and upwardly extending rods or wires 14. The top circular wire or rod 13e has a plurality of circumferentially spaced bight portions 16 through which extend the lowermost links of the suspension chains 18a, 18b and 18c. The top links of the chains are secured to the bottom hook portion 19 of a suspension spring 20 which extends through the top links of the chains while the upper end hook 22 of the spring is secured to a eye bolt 23 or other support means secured to an overhead structure 24 such as a ceiling, beam or the like.

A fibrous substance 26, such as peat moss is disposed within the basket and the roots of plants are rooted therein. It will be apparent that the fibrous substance must be watered and that the water absorbed by the fibrous substance is released to the plant roots over a period of time.

It is desirable of course that the plants be watered and the fibrous substance saturated with water without removing the basket from its support since any such removal of the hanging basket may result in injury to the plants and also may cause fragmentation and dropping off of small portions of the fibrous substance.

The watering device 10 includes a circular sheet 30, of a moisture impermeable flexible material, having a plurality of circumferentially radially spaced outwardly extending tabs 31 which are folded inwardly over reinforcing strips 32 of the same or other suitable flexible material. The sheet, tabs and strips have aligned apertures through which extend metal eyelets 35. The eyelets have external annular flanges 36 which engage the outer surface of the sheet and are held in place by circular washers 38 over which extend the outer inner flanges 39 of the eyelets.

Figure 2:
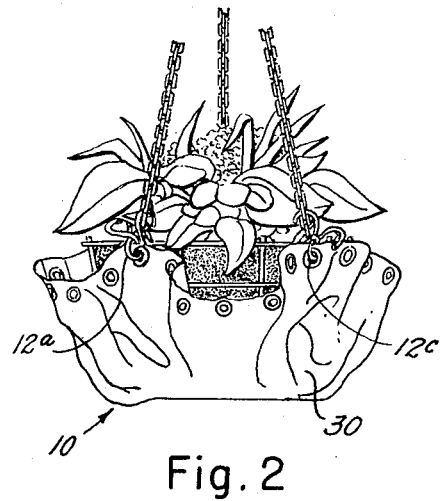
FIG. 2 is a side view showing the first step in securing the watering device to the hanging basket.
Figure 3:
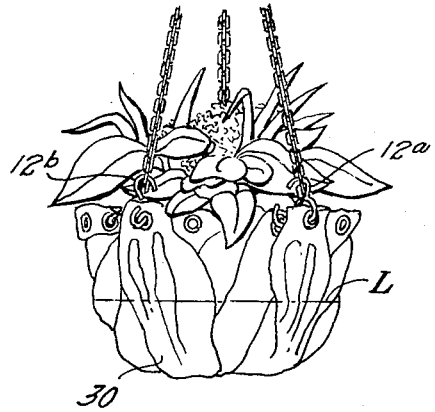
FIG. 3 is a view similar to FIG. 2 showing the peripheral portions of the inperforate sheet of the device, gathered together to form a pouch or container about the basket.
Figure 9:
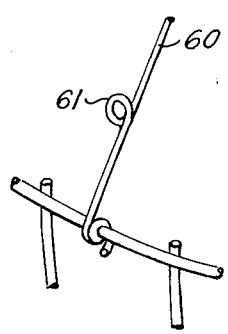
FIG. 9 is a fragmentary perspective view showing another form of the hanging flower basket.
Figure 4:
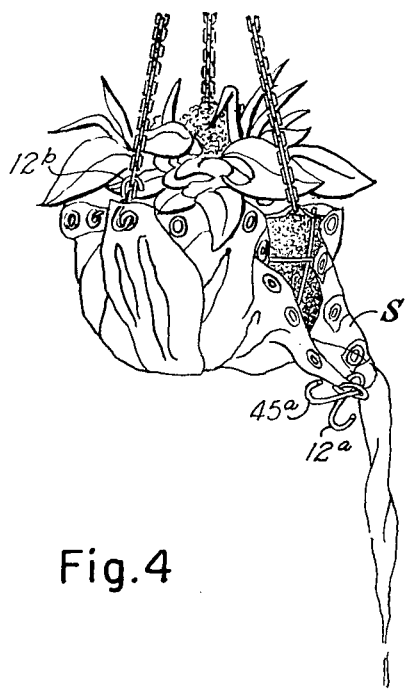
FIG. 4 is a view similar to FIG. 3 showing the manner in which excess liquid may be poured from the pouch formed by the imperforate sheet by forming a portion of the sheet into a spout.
Figure 6:
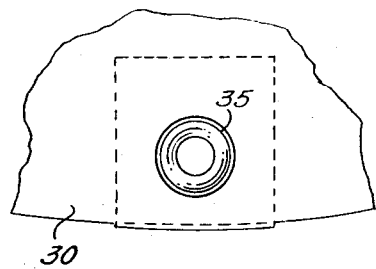
FIG. 6 is a top view enlarged fragmentary view showing one of the eyelets of the sheet.
Figure 7:
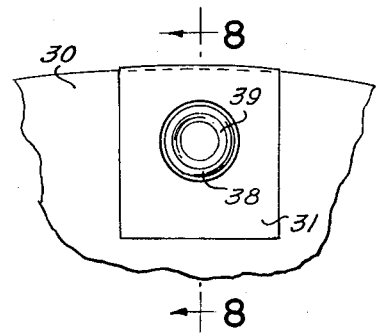
FIG. 7 is a view of the bottom side of the portion of the sheet illustrated in FIG. 6.
Figure 5:
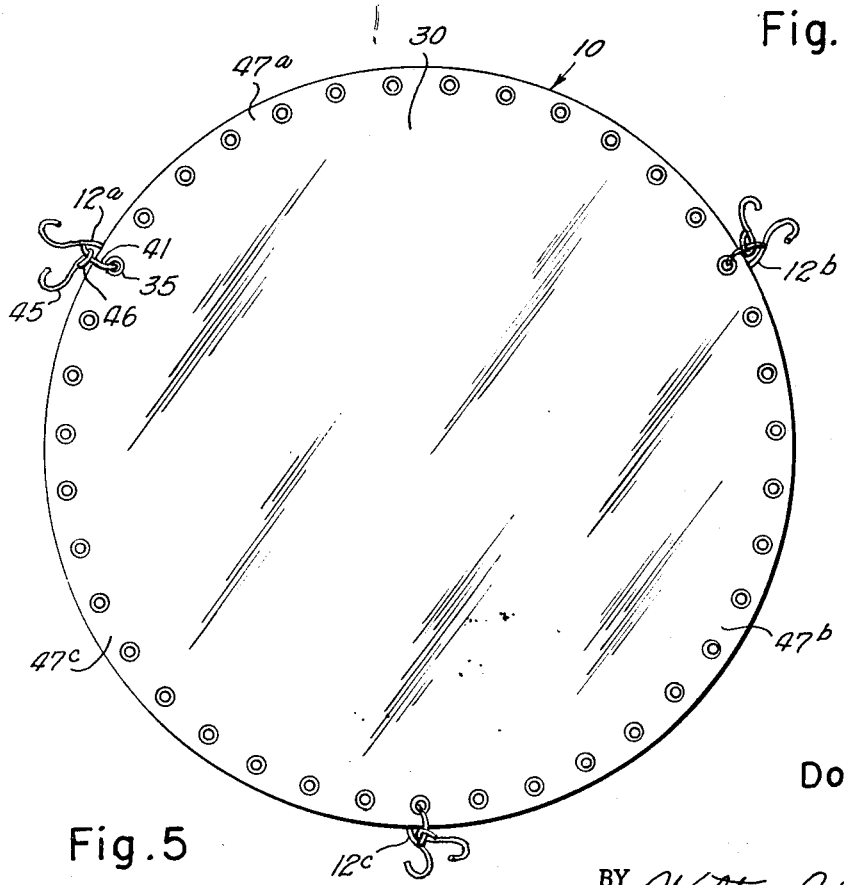
FIG. 5 is a plan view of the watering device.
Figure 8:
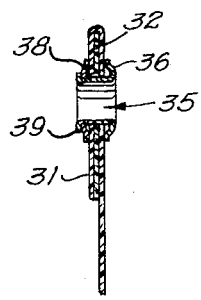
FIG. 8 is a view taken on line 8—8 of FIG. 7.

The three suspension or hanger hooks 12a, 12b and 12c have inner eye portions 41 which extend through three of the eyelets 35 which are spaced approximately 120° apart. The outer hook ends 43 of the suspension hooks are adapted to be inserted through selected links of the hanger chains 18, as illustrated in FIGS. 2, 3 and 4 of the drawings. Each of the suspension hooks has secured thereon a gathering hook 45 whose eye portion 46 is movably mounted on an eye portion 41 of a suspension hook so that each gathering hook is movably mounted on the suspension hook. The gathering hook 45 may extend through one of the eyelets of the sheet to gather the peripheral portions 47a, 47b and 47c of the sheet, between adjacent pairs of the suspension hooks, into close proximity to the basket as illustrated in FIG. 3. As illustrated in FIG. 3, the portions 47a, 47b and 47c are gathered and held close to the side of the basket to cause the sheet to form an open top container or pouch. Water in which a fertilizer is dissolved may be poured into the pouch or container so formed. The watering and feeding device is then left in position about the basket for a desired period of time sufficiently long and filled to a desired level L with water or a solution of plant nutrients. The lowermost portion of the fibrous mass or the like is immersed in this liquid.

The fibrous mass or substance absorbs the water and the plant nutrient. At the same time, the roots of the plants rooted in the fibrous substance also absorb the liquid and the plant food.

After the fibrous substance has been saturated with the liquid, one of the suspension hooks, for example, the suspension hook 12a, FIG. 4, is disconnected from the chain 18a and its gathering hook 45a is disengaged from the eyelet of the sheet through which it had been disposed to form a spout S through which any remaining liquid is allowed to drain into a suitable receptacle.

After all the liquid which remains in the pouch formed by the sheet is drained, the hook 12a may again be secured to the chain 18a and the pouch then catches any excess liquid which may drip from the fibrous substance. The accumulated liquid may again be drained from the pouch by again disconnecting one of the hanging hooks from the chain and its associated gathering hook from the eyelet in which it has been disposed to form a spout through which such accumulated drip liquid is drained into a receptable. The sheet may then be removed from the basket.

The fibrous material which is now permeated with the liquid will now supply the roots of the plants with the liquid until the liquid evaporates or is absorbed by the plants. At this time, the watering method may again be used to again cause the fibrous substance to be permeated with the water and plant food.

During the watering, the fibrous substance itself is never subjected to any shocks which might cause portions thereof to crumble and break away from the basket resulting in loss of the substance and dirtying of the floor beneath the basket. In addition no water will drip onto the floor beneath the basket due to the use of the device as a drip collector.

It will be apparent of course that the frequency of watering of the plant will be determined by the rate of absorption of liquid by the plants, by the relative humidity of the air, air currents, and the air temperature.

The baskets containing the plants may be used indoors and especially in winter to help raise the relative humidity within the rooms or building structures in which the hanging baskets are disposed since the fibrous substance provides a very large surface area for evaporation of the water absorbed thereby.

The foregoing description of the invention is explanatory only and changes in the details of the construction and the steps of the method may be made by those skilled in the art, within the scope of the appended claims, without departing from the spirit of the invention.

What is claimed and desired to be secured by Letters Patent is:

1. A device for watering plants whose roots are rooted in a fibrous substance, said device including: a suspended perforate basket; a fibrous substance disposed in said basket; and a flexible imperforate sheet having a plurality of means spaced along its periphery for releaseably securing said sheet to said basket at a plurality of spaced locations and to cause said sheet to form an upwardly open container loosely disposed about said basket in which water is receivable to permeate the fibrous substance, a portion of said sheet forming a drainage spot when one of said means at said portion is released from said basket.

2. The device of claim 1 wherein said sheet is circular in form and said mean includes a plurality of eyelets secured to the said sheet about its periphery and suspension hooks moveably secured to a plurality of the eyelets for detachably securing the sheet at three spaced locations to a suspension means of the basket.

3. The device of claim 2 and gathering means engageable with said suspension hooks and with any selected ones of said eyelets for gathering the outer peripheral portions of the sheet about a basket.

4. A method for watering and feeding plants having roots rooted in a fibrous substance disposed in a hanging perforate container, said method including placing an imperforate container about said perforate container; introducing liquid into the imperforate container to a level to cause at least the lower portion of the fibrous substance to be immersed in the liquid; maintaining the liquid in the container for a period of time to permit absorption of the liquid by the fibrous substance and the plant roots; draining the liquid from the imperforate container; allowing any excess liquid present in the fibrous substance after the draining of the imperforate container to drip into the imperforate container; and, after the dripping of excess liquid from the fibrous substance into the imperforate container has stopped, removing the imperforate container from about the basket, said imperforate container being formed of an imperforate flexible sheet, the liquid being drained from the imperforate sheet by forming a portion of the sheet into a drainage spout.

* * * * *